United States Patent [19]
Colley et al.

[11] Patent Number: 6,073,849
[45] Date of Patent: Jun. 13, 2000

[54] ELECTRONIC EDGE DETECTION SYSTEM USING A SECOND DERIVATIVE SIGNAL PROCESSOR

[75] Inventors: James E. Colley, Eugene; Patrick M. O'Donnell, Springfield, both of Oreg.

[73] Assignee: PSC Scanning, Inc., Eugene, Oreg.

[21] Appl. No.: 08/961,872

[22] Filed: Oct. 31, 1997

Related U.S. Application Data

[60] Provisional application No. 60/030,118, Nov. 1, 1996.

[51] Int. Cl.$^7$ ....................................................... G06K 7/10
[52] U.S. Cl. .................. 235/462.27; 235/462.25
[58] Field of Search ........................ 235/462.27, 462.26, 235/462.25, 436, 476, 462.01

[56] References Cited

U.S. PATENT DOCUMENTS

| | | | |
|---|---|---|---|
| 4,000,397 | 12/1976 | Hebert et al. | 235/61.1 |
| 5,103,080 | 4/1992 | Barkan | 235/462 |
| 5,140,146 | 8/1992 | Metlitsky et al. | 235/463 |
| 5,210,397 | 5/1993 | Eastman | 235/436 |
| 5,272,323 | 12/1993 | Martino | 235/462 |
| 5,298,728 | 3/1994 | Elliott et al. | 235/463 |
| 5,371,361 | 12/1994 | Arends et al. | 235/467 |
| 5,436,440 | 7/1995 | Barkan | 235/462 |
| 5,446,272 | 8/1995 | Barkan | 235/462 |
| 5,463,211 | 10/1995 | Arends et al. | 235/462 |
| 5,545,888 | 8/1996 | Barkan et al. | 235/462 |
| 5,761,341 | 6/1998 | Go | 382/232 |
| 5,814,803 | 9/1998 | Olmstead et al. | 235/462 |

OTHER PUBLICATIONS

"Electronic Filter Design Handbook,", pp. 2–53–2–68 and pp. 12–45, 12–50–12–51, 12–59–12–60, Arthur B. Williams (McGraw–Hill) (1981) missing month.

*Primary Examiner*—Donald Hajec
*Assistant Examiner*—Daniel St. Cyr
*Attorney, Agent, or Firm*—Lyon & Lyon LLP

[57] ABSTRACT

An electronic edge detection system for use in a barcode scanning system utilizing second derivative signal processing wherein the temporal offset between the first and second derivative signals is eliminated so as to enable edge detection for signal levels down to the noise level of an input signal. In a preferred embodiment, an overall filter network receives an input signal and comprises two real poles as the last elements of two parallel output channels. The first output channel terminates with a low pass filter and produces the first derivative of the input signal. The second output channel terminates with a high pass filter and produces the second derivative of the input signal. Implementing the second differentiator as one real pole of the overall edge detection system filter polynomial and placing the poles of the two output filters at the same frequency eliminates the temporal offset. Substantially constant and equal group delay over the system passband for both first and second derivative signals is also provided.

3 Claims, 3 Drawing Sheets

6,073,849

ELECTRONIC EDGE DETECTION SYSTEM USING A SECOND DERIVATIVE SIGNAL PROCESSOR

RELATED APPLICATION

This application claims the benefit of U.S. Provisional application Ser. No. 60/030,118, filed Nov. 1, 1996.

FIELD OF THE INVENTION

The field of the present invention relates to barcode scanners. In particular, it relates to electronic edge detection systems and methods for use in conjunction with barcode scanner systems utilizing second derivative signal processing.

BACKGROUND

A barcode label comprises a series of parallel dark bars of varying widths with intervening light spaces, also of varying widths. The information encoded in the barcode is represented by the specific sequence of bar and space widths, the precise nature of this representation depending on the particular barcode symbology in use.

Barcode reading methods typically comprise the generation of an electronic signal wherein signal voltage alternates between two preset voltage levels, one representative of the dark bars and the other representative of the light spaces. The temporal widths of these alternating pulses of high and low voltage levels correspond to the spatial widths of the bars and spaces. The temporal sequence of alternating voltage pulses of varying widths comprising the electronic signal is presented to an electronic decoding apparatus for decoding of the information encoded in the barcode.

A variety of common and well developed methods exist for generating the electronic signal by converting the spatial bar/space sequences into temporal high/low voltage sequences, i.e., barcode reading. Common types of barcode readers include spot scanners and line scanners.

Spot scanners comprise barcode reading systems wherein a source of illumination, the reading spot, is moved (i.e., scanned) across the barcode while a photodetector monitors the reflected or backscattered light. In one type of spot scanner system, typically referred to as a wand reader, the reading spot of the scanner is manually moved across the barcode. In another type of spot scanner system the reading spot of the scanner is automatically moved across the barcode in a controlled pattern. In any of the spot scanner systems, the path followed by the scanned illumination beam is typically referred to as a scan line.

The illumination source in spot scanners is typically a coherent light source (such as a laser), but may comprise a non-coherent light source (such as a light emitting diode). A laser illumination source, however, offers the advantage of high intensity illumination over a small area which may allow barcodes to be read over a large range of distances from the barcode scanner (large depth of field) and under a wide range of background illumination conditions. The photodetector associated with spot scanners may generate a high current when a large amount of light scattered from the barcode impinges on the detector, as from a light space, and likewise may produce a lower current when a small amount of light scattered from the barcode impinges on the photodetector, as from a dark bar.

In automatic spot scanning systems, a scanning mechanism, or scan engine, is utilized to automatically scan the illumination beam across the barcode. Such scanning mechanism may comprise a rotating mirror facet wheel, a dithering mirror, or other means for repetitively moving the illumination beam.

In addition to a scan engine, a barcode scanner may also employ a set of scan pattern generating optics to produce a multiplicity of scan lines in various directions from the scanner and at varying orientations, thereby allowing barcodes to be read over a large angular field of view and over a wide range of orientations (i.e., a multi-dimensional scan pattern). The scan pattern generating optics typically comprise a set of mirrors aligned at varying angles, each of which intercepts the illumination beam during a portion of its motion and projects it into the region in front of the barcode scanner, hereinafter referred to as the scan volume. Each mirror in the set, in conjunction with the scan engine, produces a scan line at a particular position and at a particular orientation.

Early prior art spot scanner systems depended upon individual scan lines extending across the entire barcode for the barcode to be successfully read. These systems presented difficulties and inefficiencies in real-time, practical applications wherein the orientation of a barcode vis-a-vis the scanner was hard to control. Accordingly, specialized piecing mechanisms, comprising software or electronics, have been developed that are capable of taking partial portions of barcodes and assembling them into a complete code, a process commonly known as stitching. Further details regarding exemplary stitching methods and systems may be found in U.S. Pat. No. 5,493,108, entitled "Method and Apparatus for Recognizing and Assembling Optical Code Labels" and issued in the name of inventors Craig D. Cherry and Donald D. Dieball, which patent is owned by the owner of the present application and is hereby incorporated by reference as if fully set forth herein.

With respect to line scanner systems, an entire barcode is focused onto a multi-element linear or areal photodetector array and the image of the barcode is detected. The photodetector array may comprise a CCD array (charge coupled device), a CMOS active or passive pixel sensor array, or other multi-element photodetector array. This type of reader may also include a light source to illuminate the barcode to provide the required signal response corresponding to the image. The imaging optics which produce an image of the barcode on the photodetector array can alternatively be thought of as projecting an image of the photodetector array (a "virtual scan line") into the scan volume in a manner completely analogous to the real scan line produced by a spot scanner. Further, scan pattern generating optics may be used to project multiple virtual scan lines into the scan volume in various directions and at varying orientations, thereby generating a virtual scan pattern, once again completely analogous to the real scan pattern produced by a spot scanner. Virtual scan pattern systems are further described in U.S. Pat. No. 5,446,271, entitled "Omnidirectional Scanning Method and Apparatus" and issued in the name of inventors Craig D. Cherry and Robert J. Actis, which patent is owned by the owner of the present application and is hereby incorporated by reference as if fully set forth herein.

Regardless of which of the barcode readers described in the preceding paragraphs is used, a raw electronic signal is generated from which the relative widths of the bars and spaces must be extracted. High-to-low or low-to-high transitions (i.e., edges) in the electronic signal voltage may be detected by any of a number of means well known in the art. A common and well known technique for edge detection is second derivative signal processing, wherein zero crossings of the second derivative of the electronic signal are found during selected timing intervals. An example of this technique is described in U.S. Pat. No. 4,000,397 entitled "Signal Processor Method and Apparatus" issued in the name of Hebert et al. and owned by the owner of the present application, which patent is hereby incorporated by reference as if fully set forth herein.

Under high signal-to-noise ratio conditions, previous edge detection systems may perform satisfactorily; however, under certain conditions, and particularly under low signal-to-noise ratio conditions, the instant inventors have found that several weaknesses may become apparent. In this latter regard, as a result of the first derivative signal and the second derivative signal being generated sequentially within the signal processor, there may be an inherent temporal offset between peaks of the first derivative signal and the zero crossings of the second derivative signal. For large signals, the temporal offset between the first derivative signal and the second derivative signal may not significantly impair the ability of the signal processor to detect edges in the raw input signal. As signal levels decrease, however, the usable dynamic range of the signal processor may be limited by the temporal offset between the first derivative signal and the second derivative signal, rather than by the noise of the raw input signal.

Various techniques have been suggested in order to minimize the temporal offset between the first derivative signal and the second derivative signal. For example, the signal processors may be implemented with a passive high pass filter designed with a relatively high cutoff frequency. Such high cutoff frequencies result, however, in significant reduction in the gain of the second differentiator and, hence, lower signal-to-noise ratio for the second derivative signal. As well, high cutoff frequencies may also result in reduced accuracy in detecting zero crossings of the second derivative signal, and in impaired edge detection capability of the signal processor.

Alternatively, the signal processors may employ separate filter networks to implement the second differentiation so as to minimize temporal offset. Such implementation, however, adds group delay distortion to the overall signal processor system which results in delay which is dependent upon data frequency. Under such circumstances, the detection of an edge position is affected by the presence of other nearby edges; the effect being most pronounced for edges which are close to each other in time. Accordingly, the interference may lead to increasingly inaccurate edge positions for relatively narrow bars and spaces.

Low signal conditions may arise under a variety of circumstances. In a spot scanner, the strength of the signal depends directly on the intensity of the illumination source and the efficiency of the signal collection optics. In line scanners the intensity of the illumination source and efficiency of the collection optics also determine the signal level. The signal level is particularly low in line scanners utilizing only ambient illumination. In either type of scanner, positioning the barcode out of the optimum depth of field of the scanner results in blurring of the electronic signal. The overall signal levels may not decrease very much, but the transitions in the input signal are "softer" (i.e., more gradual). This leads to smaller peaks and smaller signal-to-noise ratio in the first derivative signal and the second derivative signal. Relative tilt between a barcode and a line scanner with rectangular detector elements leads to input signals similar to those produced by blurring.

It has been suggested that these and other low signal conditions may be improved in existing scanners in a variety of ways, including but not limited to: using higher power illumination sources; enlarging the depth of field of the scanner; and/or using square detector elements in a multi-element detector array. However, these solutions may undesirably result in, inter alia, increased size, power consumption, complexity, and/or cost of the barcode scanner in question, and/or in degradation of one or more of the performance parameters or characteristics of the barcode scanner.

SUMMARY OF THE INVENTION

The present invention is an electronic signal processor edge detection system and method for use in conjunction with barcode scanner systems utilizing second derivative signal processing. In a preferred embodiment of the present invention, a second derivative signal processor edge detection system and method are provided wherein the second differentiator is implemented as one real pole of the overall edge detection system filter polynomial. The overall filter network receives the raw input signal and comprises two real poles as the last elements of two parallel output channels, respectively. The first output channel terminates with a low pass filter and produces the first derivative of the input signal. The second output channel terminates with a high pass filter and produces the second derivative of the input signal. Placing the poles of the two output filters at the same frequency eliminates any temporal offset between the first and second derivative signals which, in turn, enables edge detection for signal levels all the way down to the noise level of the input signal.

Accordingly, the preferred embodiments herein may provide one or more of the following objects and advantages:

to provide a second derivative signal processor edge detection system wherein the dynamic range is limited on the low end only by the noise in the input signal;

to provide a second derivative signal processor edge detection system wherein there is no temporal offset between first and second derivative signals:

to provide a second derivative signal processor edge detection system wherein the gain of the second differentiator is higher than in previous second derivative signal processor edge detection systems;

to provide a second derivative signal processor edge detection system wherein there is substantially constant and equal group delay over the system passband for both first and second derivative signals; and to provide a second derivative signal processor edge detection system wherein group delay distortion with respect to signal frequency is minimized.

Other objects and advantages of the present invention will become apparent to those skilled in the art from a review of the detailed description in conjunction with the accompanying drawings.

DETAILED DESCRIPTION OF PREFERRED EMBODIMENTS

Figure 1:
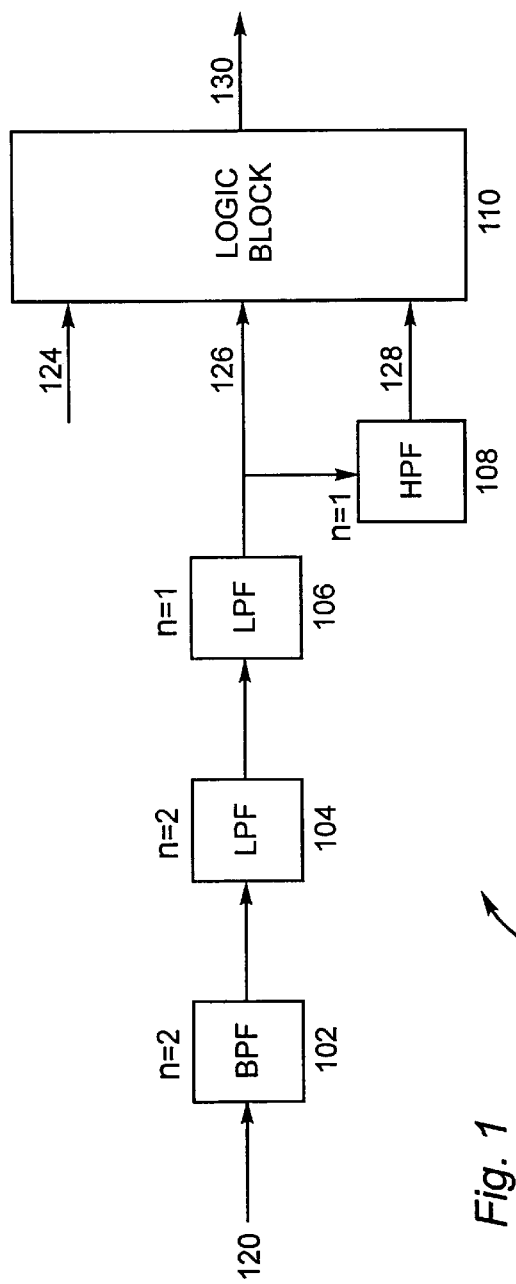
FIG. 1 is a block diagram of an exemplary known second derivative signal processor edge detection system.
Figure 2:
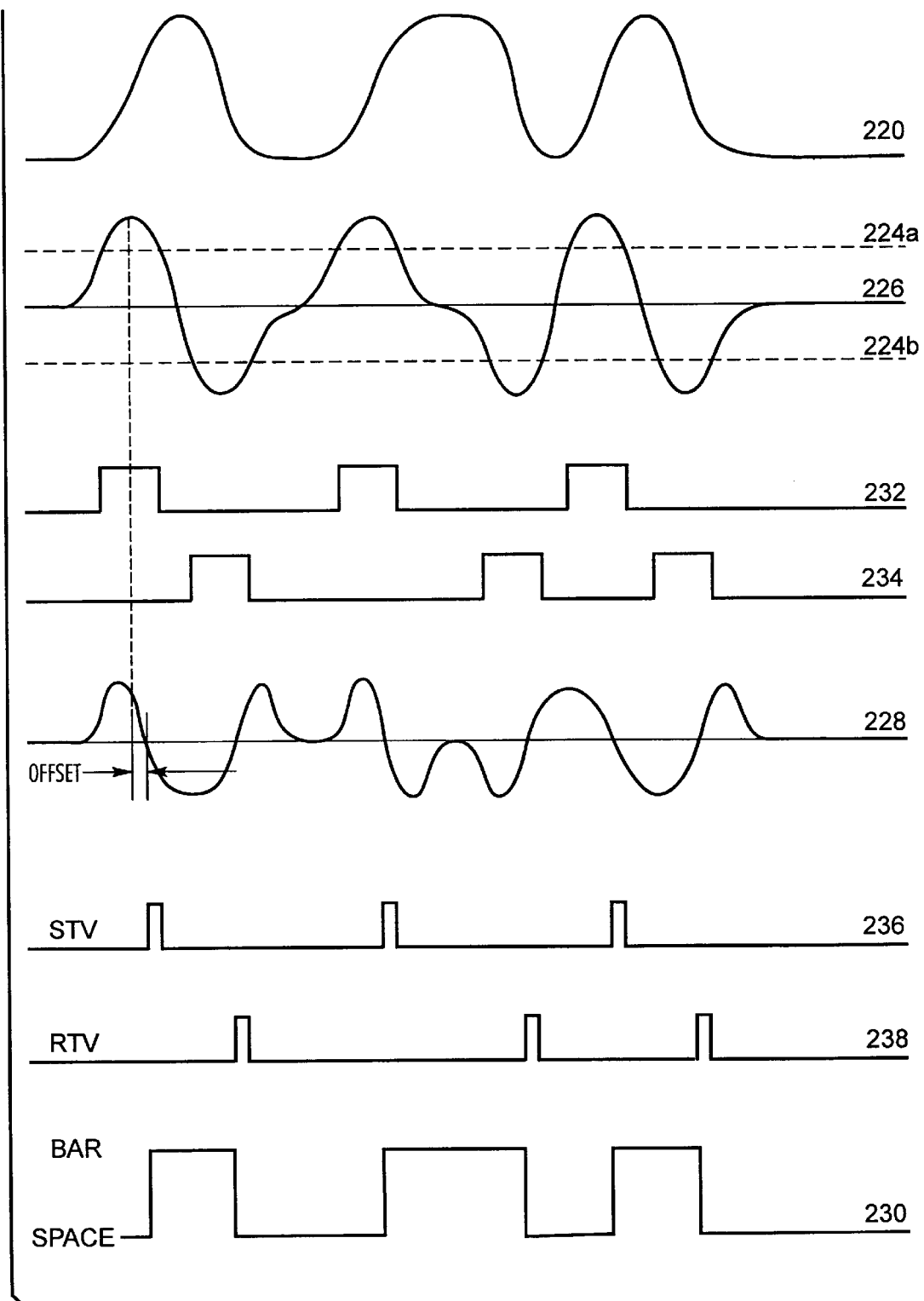
FIG. 2 illustrates exemplary waveforms corresponding to the system of FIG. 1.

An example of a known second-derivative signal processing edge detection circuit 100 is shown in FIG. 1. Such circuit comprises: 1) a second-order band pass filter 102; 2) a second-order low pass filter 104; 3) a first-order low pass filter 106; 4) a first-order high pass filter 108; and 5) a comparator logic block 110. Exemplary signal waveforms corresponding to the signals in the circuit of FIG. 1 are illustrated in FIG. 2. In the present example, increasing incident light intensity on the barcode scanner detector (e.g., photodetector(s)) corresponds to decreasing voltage in the input signal 220 on the input line 120; however, completely analogous waveforms could be generated with an input signal of the opposite polarity. For purposes of further disclosure hereinbelow, drawing elements numbered 1xx and 2xx refer, respectively, to FIG. 1 and FIG. 2.

The second-order band pass filter 102, second-order low pass filter 104, and first-order low pass filter 106 function as a filtered first differentiator, taking the time derivative of the input signal 220 on input line 120 and thereby generating the first derivative signal 226 on output line 126 of the first-order low pass filter 106. The first-order high pass filter 108 functions as a second differentiator, taking the time derivative of the first derivative signal 226 on output line 126 of the first-order low pass filter 106 and thereby generating the second derivative signal 228 on the output line 128 of the first-order high pass filter 108.

The first derivative signal 226 and the second derivative signal 228 are provided to a comparator logic block 110, along with a threshold signal 224*a* on input line 124 to the comparator logic block 110 and an inverted threshold signal 224*b*. The comparator logic block 110 generates a first comparator gate signal 232 and a second comparator gate signal 234 (corresponding to positive and negative peaks of the first derivative signal 226, respectively). The first comparator gate signal 232 is asserted when the first derivative signal 226 exceeds the threshold signal 224*a* positively; the second comparator gate signal 234 is asserted when the first derivative signal 226 exceeds the inverted threshold signal 224*b* negatively. The magnitude of the threshold signal 224*a* and the inverted threshold signal 224*b* are set higher than the noise level of the first derivative signal 226, which is, in turn, determined by the noise of the input signal 220 on input line 120.

The comparator logic block 110 also detects zero crossings of the second derivative signal 228 by comparing the second derivative signal 228 with a zero or reference voltage level. The zero crossings of the second derivative signal 228 are considered valid transitions if they occur while the appropriate first or second comparator gate signal 232 or 234 is asserted.

If a valid transition is detected while the first comparator gate signal 232 (positive) is asserted, an STV ("set video") signal 236 is asserted. The STV signal 236 remains asserted as long as the first comparator gate signal 232 continues to be asserted, thereby triggering a transition in the signal processor output signal 230 on output line 130 of the comparator logic block 110 from a SPACE signal level to a BAR signal level (a light-to-dark transition).

If a valid transition is detected while the second comparator gate signal 234 (negative) is asserted, an RTV ("reset video") signal 238 is asserted. The RTV signal 238 remains asserted as long as the second comparator gate signal 234 continues to be asserted, thereby triggering a transition in the signal processor output signal 230 on output line 130 of the comparator logic block 110 from a BAR signal level to a SPACE signal level (a dark-to-light transition).

The signal processor output signal 230 comprises a reconstructed barcode signal which may be presented to a decoder for decoding. More than one RTV signal 238 or STV signal 236 assertion may occur in the vicinity of each edge. The choice of which of the assertions to use to trigger transitions on the signal processor output signal 230 can affect the performance of the signal processor under varying signal-to-noise ratio conditions. As well, in previous signal processors, as in the above example, the zero crossings of the second derivative signal 228 are temporally offset with respect to the peaks of the first derivative signal 226. Such temporal offset results from the frequency-dependent delay introduced by the pole in the first-order high pass filter 108. While this temporal offset can be reduced by increasing the high pass filter pole frequency, the instant inventors have found that such increase may have the undesirable side effect of reducing the signal amplitude of the second derivative signal 228 and/or of increasing the system noise bandwidth.

Further details regarding second derivative detection techniques are described in U.S. Pat. No. 4,000,397, cited hereinabove. In addition, further details regarding design and construction of electronic filters for use as differentiators may be found in *Electronic Filter Design Handbook* by Arthur B. Williams (McGraw Hill, 1981), which text is incorporated by reference as if fully set forth herein.

Transitions in the input signal may also be detected by use of techniques described in U.S. Pat. No. 5,463,211, entitled "Delay-Line Based Signal Processing Method and Apparatus" and issued in the name of inventors Thomas C. Arends and Randy D. Elliott, and in U.S. Pat. No. 5,371,361, entitled "Optical Processing System" and issued in the name of inventors James E. Colley, Thomas C. Arends. Blaine F. Loris, Donald S. Peterson. James W. Ring, and Matt D. Schler, both of which patents are owned by the owner of the present application and are hereby incorporated by reference as if fully set forth herein. Further related techniques may be found in U.S. Pat. No. 5,298,728. entitled "Signal Processing Apparatus and Method" and issued in the name of inventors Randy D. Elliott and Blaine F. Loris, which patent is also owned by the owner of the present application and is hereby incorporated by reference as if fully set forth herein.

The signal processor output signal 230 comprising a reconstructed barcode signal is presented to a decoder which interprets the transition data by means well known in the art. Thus, the decoder may determine the relative widths of bars and spaces by measuring the relative time between each transition in the signal processor output signal 230. The decoder may use the bar and space measurement data to determine which of a variety of barcode symbologies have been scanned, and/or to read the particular characters encoded within the barcode. Further details regarding decoding may be found, for example, in U.S. Pat. No. 5,493,108, which patent was previously cited hereinabove.

Under high signal-to-noise ratio conditions, the edge detection system of FIG. 1 may perform satisfactorily. However, under certain conditions, and particularly under low signal-to-noise ratio conditions, the instant inventors have found that several weaknesses of previous signal processors may become apparent.

In this latter regard, there may be an inherent temporal offset between peaks of the first derivative signal 226 and the zero crossings of the second derivative signal 228 which results from the first derivative signal 226 and the second derivative signal 228 being generated sequentially within the signal processor 100. For large signals, the first derivative signal 226 exceeds the threshold signal 224 for a relatively long time interval; thus generating a relatively wide first comparator gate signal 232 or second comparator gate signal 234 during which zero crossings of the second derivative signal 228 are considered valid transitions. Under these conditions, the temporal offset between the first derivative signal 226 and the second derivative signal 228 may not significantly impair the ability of the signal processor 100 to detect edges in the input signal 220 on input line 120.

As signal levels decrease, however, the time interval during which the first derivative signal 226 exceeds the threshold signal 224 becomes shorter, thereby shortening the times during which the first comparator gate signal 232 or the second comparator gate signal 234 is asserted. When the signal levels become small enough, the temporal offset between the first derivative signal 226 and the second derivative signal 228 exceeds the width of the first comparator gate signal 232 or the second comparator gate signal 234, thus rendering the signal processor 100 unable to detect edges in the raw input signal 220. The usable dynamic range of the signal processor 100 is, therefore, limited by the temporal offset between the first derivative signal 226 and the second derivative signal 228, rather than by the noise of the input signal 220.

As suggested above, in order to minimize the temporal offset between the first derivative signal 226 and the second derivative signal 228, the high pass filter 108 of the signal processors may be designed with relatively high cutoff frequencies. Such high cutoff frequencies result, however, in significant reduction in the gain of the second differentiator and, hence, lower signal-to-noise ratio for the second derivative signal 228. High cutoff frequencies also result in reduced accuracy in detecting zero crossings of the second derivative signal 228, due to increased noise bandwidth, and in impaired edge detection capability of the signal processor 100.

Alternatively, the signal processors may employ separate filter networks to implement the second differentiation so as to minimize temporal offset. Such implementation, however, adds group delay distortion to the overall signal processor system which results in delay which is dependent upon data frequency. Under such circumstances, the detection of an edge position is affected by the presence of other nearby edges; the effect being most pronounced for edges which are close to each other in time. Accordingly, the interference may lead to increasingly inaccurate edge positions for relatively narrow bars and spaces.

Figure 3:
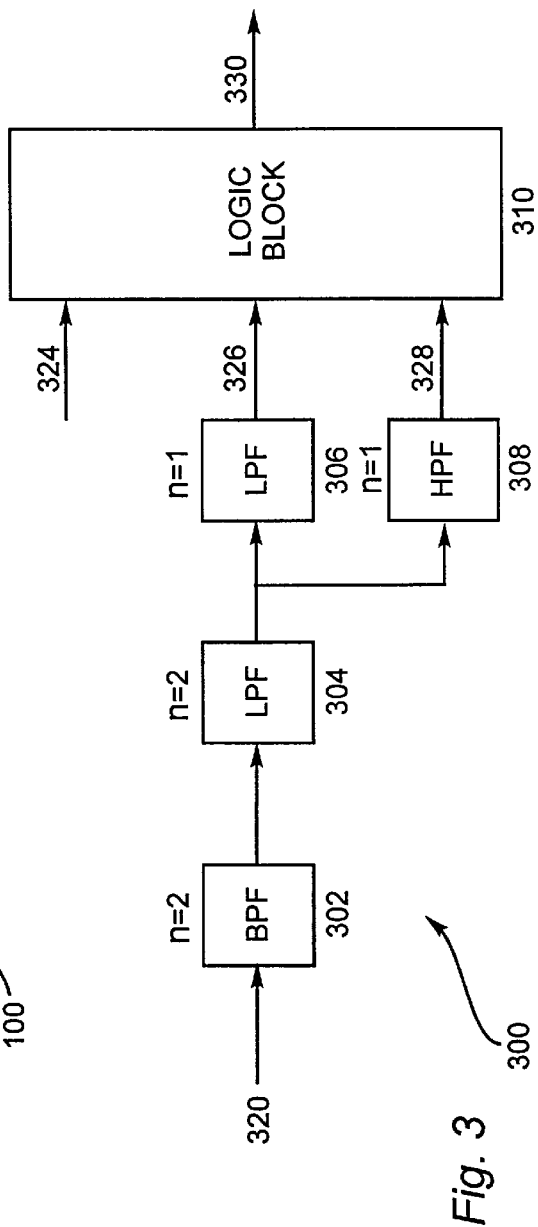
FIG. 3 is a block diagram of a second derivative signal processor edge detection system according to a preferred embodiment of the present invention.
Figure 4:
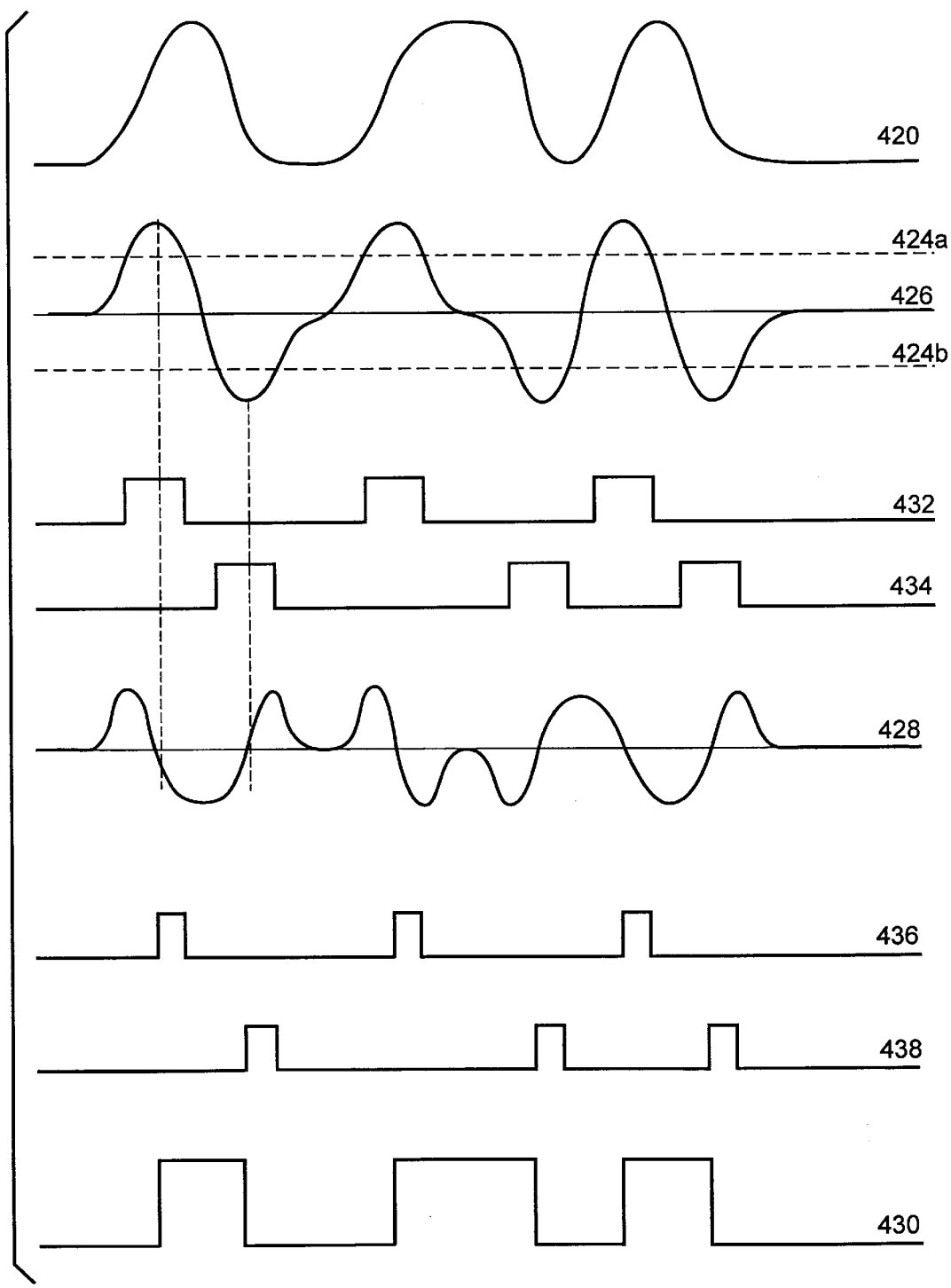
FIG. 4 illustrates exemplary waveforms corresponding to the system of FIG. 3.

With reference to FIGS. 3 and 4, a preferred embodiment of a second derivative signal processor edge detection system 300 in accordance with the present invention comprises: 1) a band pass filter 302; 2) a first low pass filter 304; 3) a second low pass filter 306; 4) a high pass filter 308; and 5) a comparator logic block 310. Exemplary signal waveforms corresponding to the preferred embodiment of FIG. 3 are illustrated in FIG. 4. For purposes of further disclosure hereinbelow, drawing elements numbered 3xx and 4xx refer, respectively, to FIG. 3 and to FIG. 4.

The second derivative signal processor edge detection system 300 is applicable to barcode scanners generally, including both manual and automatic spot scanner systems, as well as line scanner systems and other barcode scanner systems wherein a raw input signal comprising information read from a barcode is generated to be processed and subsequently decoded to identify the information encoded within the barcode. The present example assumes a system wherein increasing incident light intensity on the barcode scanner detector (e.g., photodetector(s)) corresponds to decreasing voltage in the generated input signal 420 on input line 320; however, completely analogous signal waveforms could be generated with an input signal of the opposite polarity.

In the system 300, the second low pass filter 306 and the high pass filter 308 each have a single real pole at the same frequency, which is, for typical polynomials approximating linear phase (constant group delay) response, well below the upper cutoff frequency of the overall filter polynomial. The band pass filter 302, the first low pass filter 304, and the second low pass filter 306 comprise a fifth order filter and function as a first differentiator, taking the time derivative of the input signal 420 on line 320 and thereby generating the first derivative signal 426 on line 326. The band pass filter 302, the first low pass filter 304, and the high pass filter 308 comprise a fifth order filter and function as a second differentiator, taking the second time derivative of the input signal 420 and thereby generating the second derivative signal 428 on line 328.

The first derivative signal 426 on line 326, and the second derivative signal 428 on line 328 are provided to the comparator logic block 310 along with a threshold signal 424a on line 324 and an inverted threshold signal 424b. The comparator logic block 310 generates a first comparator gate signal 432 and a second comparator gate signal 434 (corresponding to positive and negative peaks of the first derivative signal 426, respectively). The first comparator gate signal 432 is asserted when the first derivative signal 426 exceeds the threshold signal 424a positively; the second comparator gate signal 434 is asserted when the first derivative signal 426 exceeds the inverted threshold signal 424b negatively. The magnitude of the threshold signal 424a and the inverted threshold signal 424b are set higher than the noise level of first derivative signal 426, which is, in turn, determined by the magnitude and spectral characteristics of the noise of the input signal 420 on line 320.

The comparator logic block 310 also detects zero crossings of the second derivative signal 428 by comparing the second derivative signal 428 with a zero or reference voltage level. The zero crossings of the second derivative signal 428 are considered valid transitions if they occur while the appropriate first comparator gate signal 432 or second comparator gate signal 434 is asserted.

If a valid transition is detected while the first comparator gate signal 432 (positive) is asserted, an STV ("set video") signal 436 is asserted while the comparator gate signal 432 continues to be asserted, thereby triggering a transition in the signal processor output signal 430 on output line 330 of comparator logic block 310 from a SPACE signal level to a BAR signal level (a light-to-dark transition).

If a valid transition is detected while the second comparator gate signal 434 (negative) is asserted, an RTV ("reset video") signal 438 is asserted while the second comparator gate signal 434 continues to be asserted, thereby triggering a transition in the signal processor output signal 430 on output line 330 of comparator logic block 310 from a BAR signal level to a SPACE signal level (a dark-to-light transition).

The signal processor output signal 430 on output line 330 of comparator logic block 310 thus comprises a reconstructed barcode signal which may be presented to a decoder for decoding. More than one RTV signal 438 or STV signal 436 assertion may occur in the vicinity of each edge. The choice of which of multiple assertions of either the RTV signal 438 or the STV signal 436, respectively, to use to trigger transitions in the signal processor output signal 430 can affect the performance of the signal processor under varying signal-to-noise ratio conditions. Any of the schemes (e.g., first RTV/first STV, last RTV/first STV, first RTV/last STV, last RTV/last STV, etc.) may be used in the signal processor edge detection system 300 in accordance with the inventive concepts set forth herein. In the preferred signal processor edge detection system 300, the zero crossings of the second derivative signal 428 are coincident with the peaks of the first derivative signal 426, thereby eliminating the temporal offset between the first derivative signal 426 and the second derivative signal 428. As well, a dynamic range for edge detection which is limited by the signal-to-noise ratio of the derivative signals, and is not limited by temporal offset between the derivative signals, is thus provided.

In a specific application of the preferred embodiment:

the band pass filter 302 comprises a second order filter with two complex poles of the overall fifth order filter polynomial;

the first low pass filter 304 comprises a second order filter with the remaining two complex poles of the overall fifth order filter polynomial;

the second low pass filter 306 comprises a first order filter with the single real pole of the overall fifth order filter polynomial; and, the high pass filter 308 comprises a first order filter with the single real pole of the overall fifth order filter polynomial placed at the same frequency as the single real pole of the second low pass filter 306.

As a result of placing the single real poles of the second low pass filter 306 and the high pass filter 308 at the same frequency, any temporal offset between the first derivative signal 426 and the second derivative signal 428 is eliminated. For typical linear phase approximation filter polynomials, the instant inventors have identified that this frequency is well below the cutoff frequency for the overall filter network, thereby increasing the gain of the second differentiator, decreasing the noise bandwidth of the second differentiator, and increasing the signal-to-noise ratio of the second derivative signal 428 substantially over previous second derivative signal processors. The instant inventors have further found that improved signal-to-noise ratio in the second derivative signal 428 results in improved edge detection capability and more accurate edge detection for the preferred embodiment signal processor 300 over that of previous signal processors.

Additionally in accordance with the preferred embodiment, the band pass filter 302 and the first low pass filter 304 may be designed so that their use in combination with each other and with either the second low pass filter 306 or the high pass filter 308 results in a fifth order filter network with substantially constant group delay over the overall filter passband. Constant group delay eliminates group delay distortion as a source of error in edge position detection.

In an alternative embodiment, the band pass filter 302 and the first low pass filter 304 may be replaced by any functionally equivalent filter network. Such a functionally equivalent filter network should transform the input signal 420 on input line 320 into a signal for presentation to the second low pass filter 306 and the high pass filter 308 such that: 1) the resulting output of the second low pass filter 306 is equivalent to a delayed first time derivative 426 of the input signal 420; 2) the resulting output of the high pass filter 308 is equivalent to a similarly delayed second time derivative signal 428 of the input signal 420; and 3) the resulting first derivative signal 426 and second derivative signal 428 have substantially constant and equal group delay over the overall filter passband. It is envisioned that such a functionally equivalent filter network may comprise passive circuit elements, active circuit elements, or combinations thereof.

Design of the overall filter network for constant group delay over the system passband for both output channels simultaneously, thereby virtually eliminating a primary source of delay distortion, is also provided as a result of placing the poles of the two output filters at the same frequency. Further, since there is no need to minimize the delay through the second differentiator, the real pole of the second differentiator may be placed at a relatively lower frequency than in previously known second derivative edge detection systems, and typically much lower than the cutoff frequency of the overall filter network. The resulting higher gain of the second differentiator allows generation of second derivative signals with much higher signal-to-noise ratio and, therefore, more accurate detection of zero crossings of the second derivative signal. It is noted that, as used in, and for purposes of, this specification, the terms "linear phase" and "constant group delay" are interchangeable.

Other alternative embodiments may be devised, and are intended to be within the scope of this application, wherein polynomial orders other than fifth order are implemented with benefits corresponding to those detailed above with respect to the preferred embodiment. Likewise, if an even-order polynomial is desired, the final parallel stages (low pass filter and high pass filter) may be implemented as second-order filters.

The present invention has been set forth in the form of its preferred embodiments. It is nevertheless intended that modifications to the disclosed second derivative signal processing electronic edge detection system and method may be made without departing from the scope and spirit of the inventive concepts set forth herein and defined in the appended claims.

What is claimed is:

1. In a barcode scanner system, a second derivative signal processor for detecting edges representing bar and space transitions in an input signal, said second derivative signal processor comprising an overall filter polynomial having even order which further comprises:

a first filter receiving the input signal and providing a filtered signal;

a first output channel terminating with a first filter having a complex pole pair with a first cutoff frequency and damping ratio, said first output channel receiving the filtered signal and producing the first derivative of the input signal; and, a second output channel parallel to said first output channel and terminating with a second filter having a complex pole pair with the first cutoff frequency and damping ratio; said second output channel receiving the filtered signal and producing the second derivative of the input signal, wherein the first filter is a low pass filter of second order and the second filter is a high pass filter of second order, and wherein the cutoff frequency and damping ratio of the low pass filter and the high pass filter are substantially equal.

2. In a barcode scanner system, a second derivative signal processor for detecting edges representing bar and space transitions in an input signal, said second derivative signal processor comprising an overall odd order filter polynomial which further comprises:

first filtering circuitry for receiving an input signal and providing a first filtered output signal;

second filtering circuitry for receiving the first filtered output signal and providing a first derivative signal; and, third filtering circuitry for receiving the first filtered output signal and providing a second derivative signal, wherein the first derivative signal is delayed by a first time period and the second derivative signal is delayed by substantially the same first time period such that the first derivative signal and the second derivative signal have substantially constant and equal group delay over the overall filter passband.

3. In a barcode scanning system, a signal processing method for detecting edges representing bar and space transitions in an input signal utilizing the first derivative and the second derivative of the input signal comprising the steps of:

(a) receiving an input signal;

(b) processing the input signal through a first filtering circuitry to provide a first filtered output signal;

(c) processing the first filtered output signal through a second filtering circuitry to provide a first derivative signal; and, (d) processing the first filtered output signal through a third filtering circuitry to provide a second derivative signal, wherein steps (c) and (d) occur in parallel and further wherein the first derivative signal comprises the first derivative of the input signal delayed by a first time period and the second derivative signal comprises the second derivative of the input signal similarly delayed by the first time period such that the first derivative signal and the second derivative signal have substantially constant and equal group delay over the overall passband of the combined first, second, and third filtering circuitry.

* * * * *